(12) United States Patent
Jin (10) Patent No.: US 9,523,584 B2
(45) Date of Patent: Dec. 20, 2016

(54) NAVIGATION SYSTEM WITH ROUTE OPTIMIZATION MECHANISM AND METHOD OF OPERATION THEREOF

(71) Applicant: Telenav, Inc., Sunnyvale, CA (US)

(72) Inventor: HaiPing Jin, Saratoga, CA (US)

(73) Assignee: Telenav, Inc., Santa Clara, CA (US)

( * ) Notice: Subject to any disclaimer, the term of this patent is extended or adjusted under 35 U.S.C. 154(b) by 41 days.

(21) Appl. No.: 14/303,167

(22) Filed: Jun. 12, 2014

(65) Prior Publication Data

US 2015/0362324 A1    Dec. 17, 2015

(51) Int. Cl.
*G01C 21/34* (2006.01)

(52) U.S. Cl.
CPC .................. *G01C 21/3469* (2013.01)

(58) Field of Classification Search
CPC ............ G02C 21/3461; G02C 21/3484; G02C 21/3469; G02C 21/34; B60W 50/085; B60W 10/06; B60T 7/12; G06F 17/3087; G06F 17/30241; G01C 21/3469; G01C 21/3611; G01C 21/3629; B60R 16/03; G06Q 30/0623
USPC ............ 701/1, 70, 123, 411, 533, 34.2, 538; 705/14.6, 14.5, 26.61; 455/88
See application file for complete search history.

(56) References Cited

U.S. PATENT DOCUMENTS

| | | | |
|---|---|---|---|
| 7,512,486 B2 | 3/2009 | Needham et al. | |
| 8,326,485 B2 | 12/2012 | Hyde et al. | |
| 8,368,169 B2 | 2/2013 | Han et al. | |
| 8,538,694 B2* | 9/2013 | Conway | G01C 21/3469 340/995.19 |
| 2003/0004826 A1* | 1/2003 | Nishiwaki | G06Q 30/0623 705/26.61 |
| 2006/0190167 A1* | 8/2006 | Inukai | G01C 21/3629 701/533 |
| 2006/0287775 A1* | 12/2006 | Bechtold | B60R 16/03 701/1 |
| 2009/0063045 A1 | 3/2009 | Figueroa et al. | |
| 2010/0106603 A1* | 4/2010 | Dey | G01C 21/3484 705/14.63 |
| 2012/0173075 A1* | 7/2012 | Mays | B60W 10/06 701/34.2 |
| 2012/0316699 A1* | 12/2012 | Filev | B60W 50/085 701/1 |
| 2013/0013189 A1* | 1/2013 | Nishibashi | G01C 21/3461 701/411 |
| 2013/0046466 A1* | 2/2013 | Yucel | G01C 21/3469 701/538 |
| 2014/0080428 A1* | 3/2014 | Rhoads | G06F 17/30241 455/88 |
| 2015/0232099 A1* | 8/2015 | Miller | B60T 7/12 701/70 |
| 2016/0069700 A1* | 3/2016 | Koertge | G01C 21/3611 701/538 |

FOREIGN PATENT DOCUMENTS

EP    2472230 A2    7/2012

* cited by examiner

*Primary Examiner* — Yuri Kan
(74) *Attorney, Agent, or Firm* — IP Investment Law Group (57) ABSTRACT

A method of operation of a navigation system includes: generating a route having a travel time and a travel distance; determining a context for using the route; determining a fuel usage factor based on the context for evaluating the route; calculating a fuel estimate for the route based on the fuel usage factor; and determining a fuel-optimization route based on the fuel estimate for displaying on a device.

20 Claims, 5 Drawing Sheets

NAVIGATION SYSTEM WITH ROUTE OPTIMIZATION MECHANISM AND METHOD OF OPERATION THEREOF

TECHNICAL FIELD

An embodiment of the present invention relates generally to a navigation system, and more particularly to a system with a route optimization mechanism.

BACKGROUND ART

Modern consumer and industrial electronics, especially devices such as graphical navigation systems, televisions, projectors, cellular phones, portable digital assistants, and combination devices, are providing increasing levels of functionality to support modern life including location-based information services. Research and development in the existing technologies can take a myriad of different directions.

As users become more empowered with the growth of mobile communication technology, new and old paradigms begin to take advantage of this new space. One such space is regarding use of location information for route optimization. The possible applications for combination of navigational capabilities and various optimized routes have not yet been fully utilized.

Thus, a need still remains for a navigation system with route optimization mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a navigation system including: generating a route having a travel time and a travel distance; determining a context for using the route; determining a fuel usage factor based on the context for evaluating the route; calculating a fuel estimate for the route based on the fuel usage factor and the route; and determining a fuel-optimization route based on the fuel estimate for displaying on a device.

An embodiment of the present invention provides a navigation system, including: a control unit for: generating a route having a travel time and a travel distance; determining a context for using the route; determining a fuel usage factor based on the context for evaluating the route; calculating a fuel estimate for the route based on the fuel usage factor and the route; and determining a fuel-optimization route based on the fuel estimate; and a user interface, coupled to the control unit, for: displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which navigation information is expressed is not critical to some embodiments of the invention. For example, in some embodiments, navigation information is presented in the format of (X, Y); where X and Y are two coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein can include the navigation information described as well as information relating to points of interest to the user, such as local business, hours of businesses, types of businesses, advertised specials, traffic information, maps, local events, and location based community or personal information.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Figure 1:
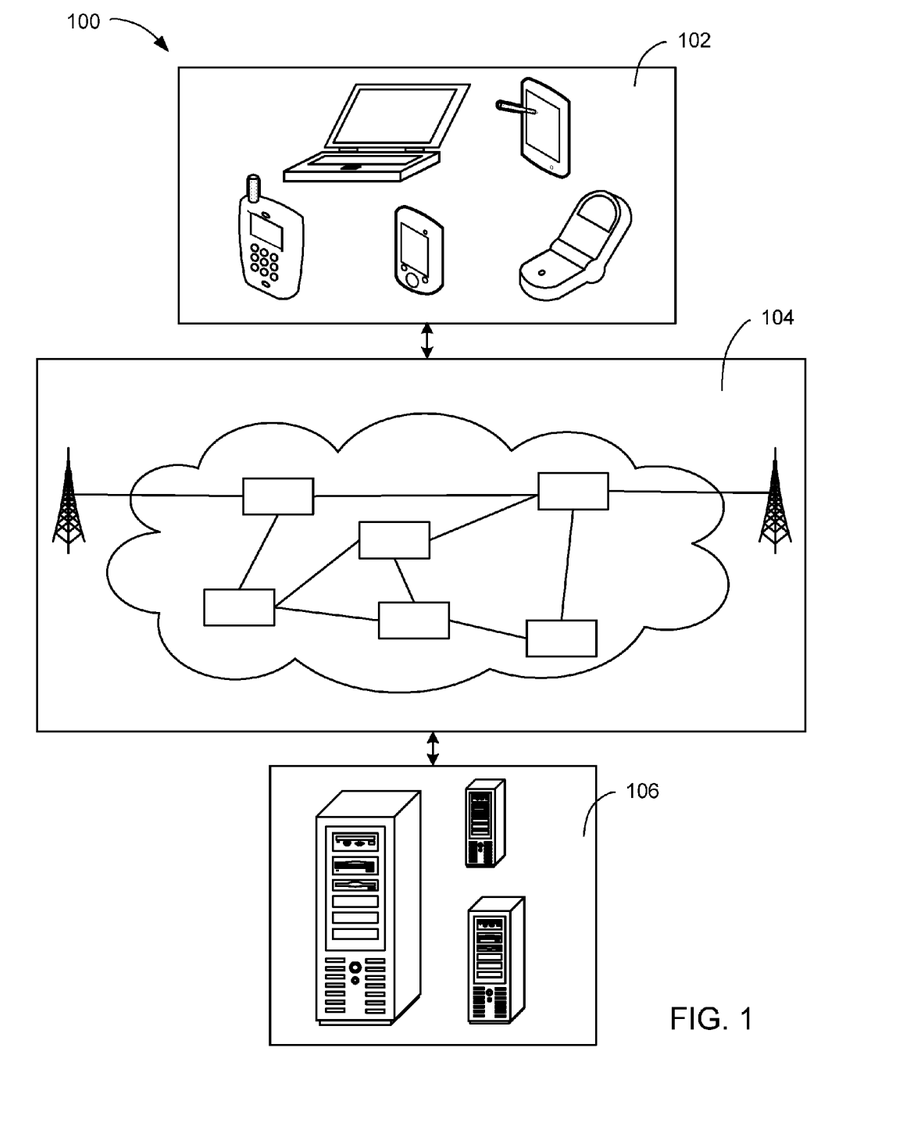
FIG. 1 is a navigation system with route optimization mechanism in an embodiment of the present invention.

Referring now to FIG. 1, therein is shown a navigation system 100 with route optimization mechanism in an embodiment of the present invention. The navigation system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of display devices, such as a cellular phone, personal digital assistant, a notebook computer, automotive telematics navigation system, or other multi-functional mobile communication or entertainment device. The first device 102 can couple, either directly or indirectly, to the communication path 104 to communicate with the second device 106 or can be a stand-alone device. The first device 102 further be separate form or incorporated with a vehicle, such as a car, truck, bus, or train.

For illustrative purposes, the navigation system 100 is described with the first device 102 as a mobile computing device, although it is understood that the first device 102 can be different types of devices. For example, the first device 102 can also be a non-mobile computing device, such as a server, a server farm, or a desktop computer.

The second device 106 can be any of a variety of centralized or decentralized computing devices, or video transmission devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the communication path 104 to communicate with the first device 102. The second device 106 can also be a client type device as described for the first device 102.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, such as a car, a truck, a bus, or a train.

Also for illustrative purposes, the navigation system 100 is described with the second device 106 as a computing device, although it is understood that the second device 106 can be different types of devices. Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can span and represent a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
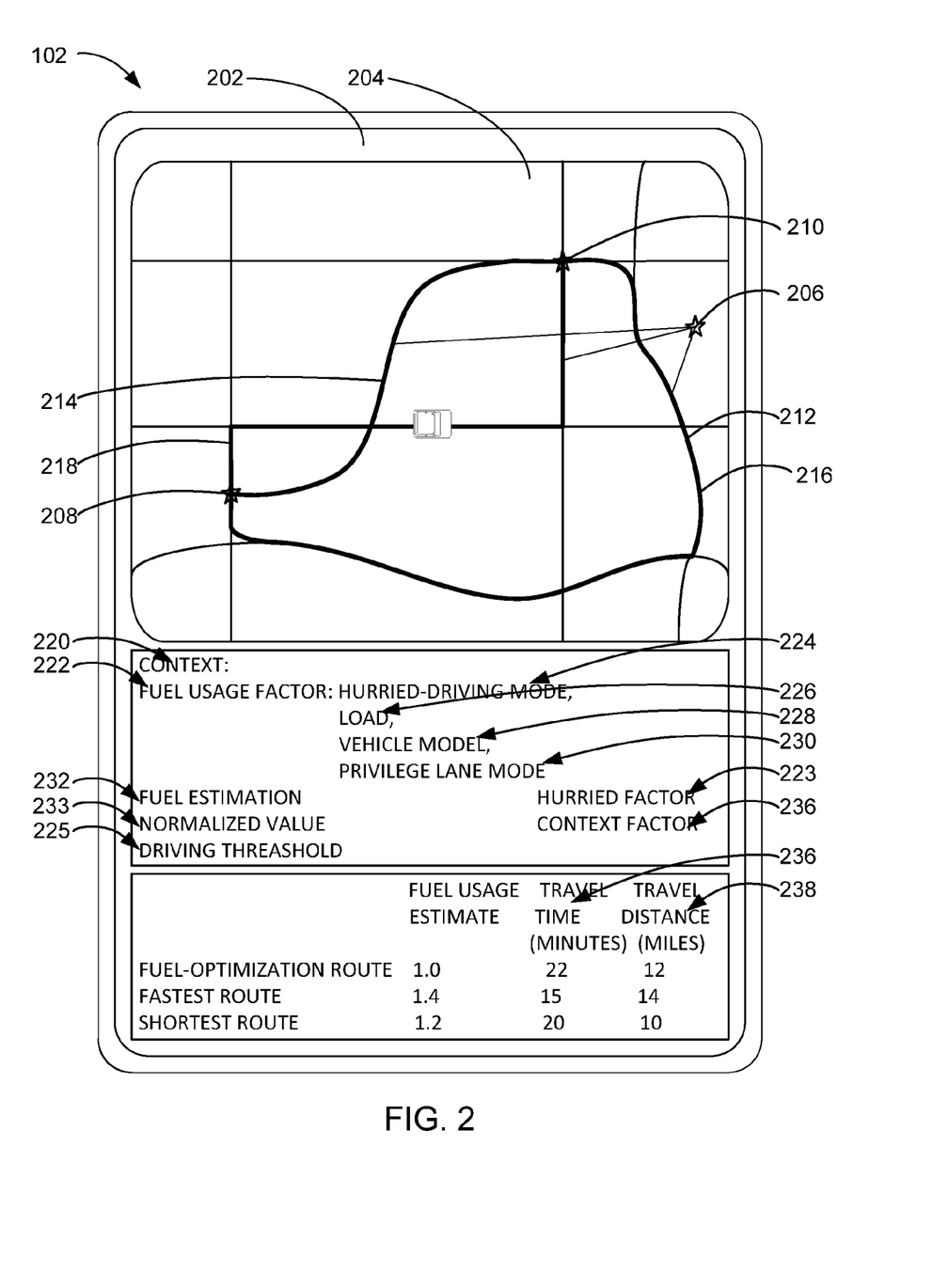
FIG. 2 is an example of a display interface of the first device.

Referring now to FIG. 2, therein is shown an example of a display interface 202 of the first device 102. The display interface 202 can depict a map 204. The map 204 can show a route 206 having a starting location 208 and a destination 210. The map 204 can also show a privilege lane 212.

The privilege lane 212 is defined as a restricted traffic lane reserved for use by a driver meeting a required condition. For example, the required condition can include vehicle occupancy requirement such as having one or more passengers in a vehicle operated by the user. Also for example, the required condition can include a membership or a payment associated with the usage of the privilege lane 212. As a more specific example, the privilege lane 212 can include a high-occupancy vehicle lane, a carpool lane, a toll lane, a diamond lane, or T2 or T3 lanes in Australia and New Zealand.

The navigation system 100 can determine the route 206 based on one or more conditions. For example, the navigation system 100 can generate a distance-based route 214, a time-based route 216, a fuel-optimization route 218, or a combination thereof.

The distance-based route 214 can be a route based on a minimum travel distance. The time-based route 216 can be a route for minimizing a travel time. The distance-based route 214, the time-based route 216, or a combination thereof can be further based on other parameters, such as user preference, user history, user's estimated familiarity in an area, contextual information, or a combination thereof.

The fuel-optimization route 218 is a route including a series of connected path for minimizing fuel consumption in traversing from the starting location 208 to the destination 210. The fuel-optimization route 218 can be further based on other parameters such as user preference, user history, user's estimated familiarity in an area, contextual information, traffic information, timing of traffic controllers as signal lights, or a combination thereof.

A fuel usage factor 222 is defined as information regarding one or more parameters affecting usage or a rate of usage of fuel or energy for operating a vehicle. Examples for the fuel usage factor 222 can include a hurried-driving mode 224, a load 226, a vehicle model 228, a privilege-lane mode 230, or a combination thereof. The navigation system 100 can determine the fuel usage factor 222 based on a context 220.

The fuel usage factor 222 can be based on human behavior, a condition or characteristic of the vehicle, a road condition, or a combination thereof. The fuel usage factor 222 can be determined by the navigation system 100 as having influence on fuel usage when traversing the route 206. The fuel usage factor 222 can also include a level of traffic congestion, road condition, weather condition, departure time, arrival time, or a combination thereof.

The context 220 is defined as information attributing significance, purpose, or meaning to a condition or a situation. The context 220 can include a description regarding the driver, the vehicle maneuvered by the driver, a series of road segments leading to the destination 210, or a combination thereof. The context 220 can include the information identified from a user calendar, user email, a social media, a user profile, a car profile, a traffic control center, a weather station, or a combination thereof. The context 220 can also include the information regarding passengers, luggage, or a combination thereof in the vehicle.

A hurried factor 223 is defined as an element contributing to a driving behavior with haste. For example, the hurried factor 223 can include the traffic condition, the departure time, the arrival time, the event time, or a combination thereof. Also for example, the hurried factor can include a vehicle speed, an acceleration, a deceleration, or a combination thereof meeting or exceeding a driving threshold 225 predetermined by the navigation system 100.

The hurried-driving mode 224 is defined as an indication of a driving behavior with negative impact on the fuel usage. The hurried-driving mode 224 can be determined by the hurried factor 223 such as the predetermined keyword, the traffic condition, the departure time, the arrival time, the event time, or a combination thereof. The hurried-driving mode 224 can also be determined by the hurried factor 223 such as vehicle speed, an acceleration, a deceleration, or a combination thereof meeting or exceeding a driving threshold 225 predetermined by the navigation system 100.

The hurried-driving mode 224 can cause non-optimal fuel utilization of fuel. The hurried-driving mode 224 can be based on the context 220. The navigation system 100 can further predict the hurried-driving mode 224 based on the context 220. The hurried-driving mode 224 can be represented by Boolean value or integer value, such as true or one.

The driving threshold 225 is defined as the specified vehicle speed, the acceleration, the deceleration, or a combination thereof for classifying driving behavior with negative impact on the fuel consumption. For example, the driving threshold 225 can be a certain percentage more than the road speed limit, a specified percentage more than the normal acceleration based on the driving history, a particular percentage more than the normal deceleration based on the driving history, or a combination thereof.

As a more specific example, the context 220 can include a keyword, such as "emergency" or "heart attack" detected in the user's communication information, such as in an email or a text message. Also as a more specific example, the context 220 can include the destination 210 as a hospital, a call history including a call to an emergency service, or a combination thereof. The navigation system 100 can determine the hurried-driving mode 224 based on the context 220 by predicting user behavior of hurried driving.

Also for example, the context 220 can indicate a class associated with the user starting in thirty minutes with a current level of traffic congestion exceeding an average level of congestion for the route 206 based on the historic traffic information. The navigation system 100 can determine or predict the hurried-driving mode 224 based on the context 220.

The load 226 is defined as a person or an object physically associated with the vehicle in addition to the vehicle and the user maneuvering the vehicle. The load 226 can be based on the context 220. The context 220 can include the number of passengers, the number of luggage, an extra weight excluding the vehicle weight and the driver weight, or a combination thereof. For example, the load 226 can be a determination or identification of a number of passengers or luggage.

The vehicle model 228 is defined as a particular brand or model identification of the vehicle. The vehicle model 228 can be determined by the manufacturer for selling the vehicle. The vehicle model 228 can include or indicate an identification of a feature or a specification of the vehicle.

For example, the vehicle model 228 can identify a power management system of the vehicle, including a hybrid vehicle system, a turbocharged or a supercharged engine, or a combination thereof. Also for example, the vehicle model 228 can identify an exterior style or a class of the vehicle, including a sedan, a coupe, a wagon, a truck, or a combination thereof. For further example, the vehicle model 228 can identify an input fuel type, such as gasoline, diesel, electric, or a combination thereof.

The privilege-lane mode 230 is defined as a status associated with the user meeting one or more requirements for accessing the privilege lane 212. The privilege-lane mode 230 can indicate a current situation or a current environment for the user meeting or exceeding the set minimum number of occupants within a vehicle for accessing the privilege lane 212, meeting a time restriction, validity of a membership or a privilege for accessing the privilege lane 212, availability of funds required for accessing the privilege lane 212, or a combination thereof. The privilege-lane mode 230 can be represented as a Boolean value or an integer value, such as true, false, a non-zero integer or zero.

For example, the navigation system 100 can determine the privilege-lane mode 230 as true based on the context 220 regarding the user driving with two passengers in the vehicle if the requirement is for two or more occupants in a vehicle. Also for example, the navigation system 100 can assign the privilege-lane mode 230 as one or a non-zero integer when the user has the membership to access the privilege lane 212. For another example, the navigation system 100 can determine the privilege lane mode 230 as true when the user has the privilege to access the privilege lane 212 based on two and more occupants in the vehicle and a departure time or an arrival time for traversing the route 206 is within the time limitation for accessing the privilege lane 212.

The device interface 202 can show a fuel estimate 232. The fuel estimate 232 is defined as an approximation of fuel consumption for traversing the route 206 from the starting location 208 to the destination 210. The fuel estimate 232 can be represented in multiple ways. The fuel estimate 232 can be an approximate amount of fuel, such as in gallons or liters, likely necessary to traverse the route 206. The fuel estimate 232 can also be represented as a normalized value 233 based on a standard or a relationship between multiple routes.

The normalized value 233 is defined as a scaled or shifted value of the fuel estimate 232 created to allow the comparison of two or more fuel estimates. It has been discovered that the fuel estimate 232 represented with the normalized value 233 provides an easy to compare format for comparing multiple routes. For example, the fuel estimate 232 for the distance-based route 214, the time-based route 216 and the fuel-optimization route 218 can be represented as 1.2, 1.4 and 1.0, respectively. The user or the navigation system 100 can calculate quickly that the distance-based route 214 consumes twenty percent more fuel than the fuel-optimization route 218 and the time-based route 216 uses forty percent more fuel than the fuel-optimization route 218.

The device interface 202 can depict the route 206, the fuel estimate 232, a travel time 236, a travel distance 238, or a combination thereof on display. The user or the navigation system 100 can use the information regarding the fuel estimate 232, the travel time 236, the travel distance 238, or a combination thereof for selecting the route 206. The travel time 236 can be the time for traversing the route 206. The travel distance 238 can be a measure of physical space along a specific route between the starting location 208 and the destination 210. Details regarding the operation of the navigation system 100 will be described below.

Figure 3:
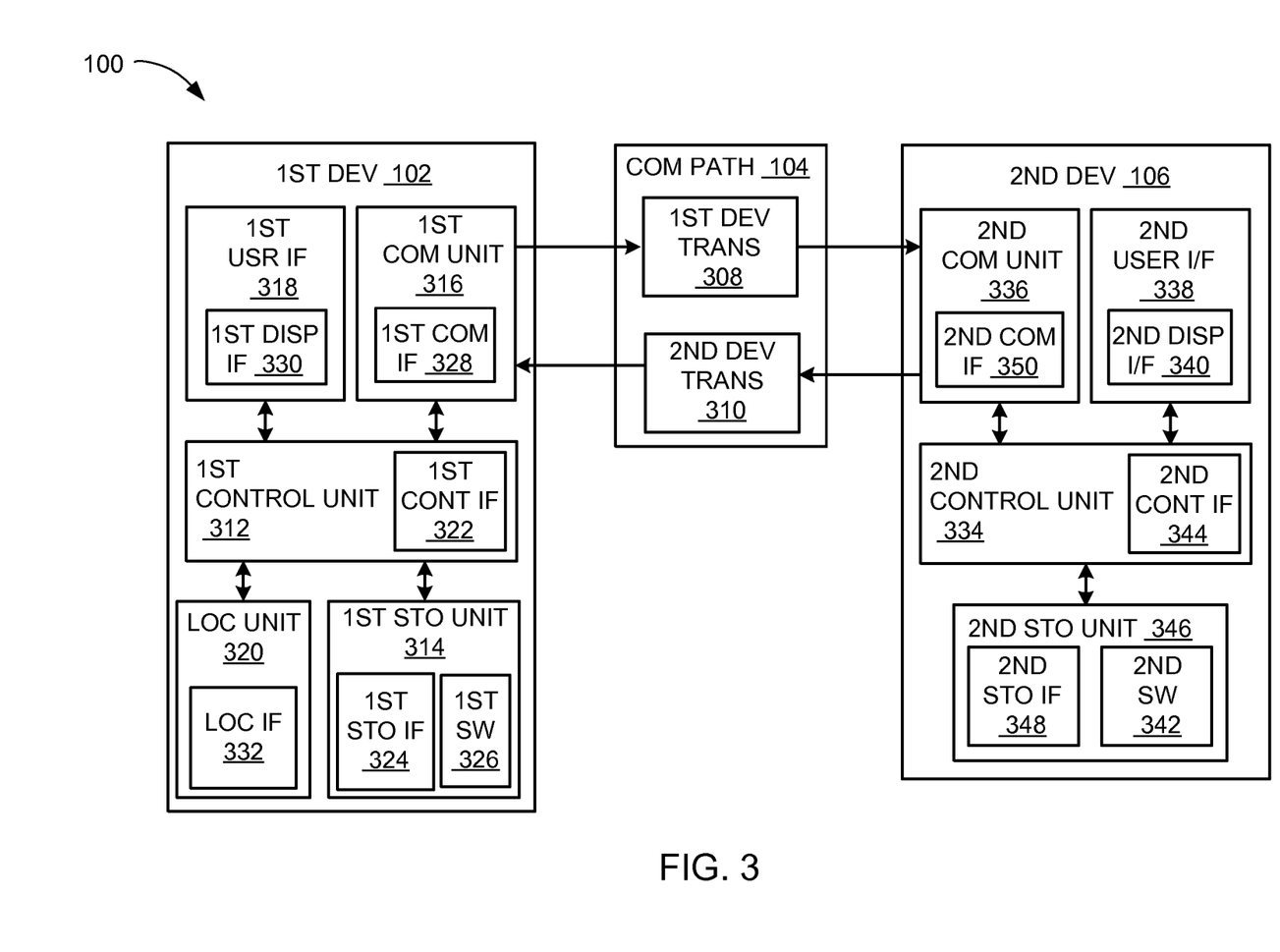
FIG. 3 is an exemplary block diagram of the navigation system.

Referring now to FIG. 3, therein is shown an exemplary block diagram of the navigation system 100. The navigation system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server having a display interface.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, and a first user interface 318, and a location unit 320. The first control unit 312 includes a hardware circuitry and can include a first control interface 322. The first control unit 312 can execute a first software 326 to provide the intelligence of the navigation system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as data representing incoming images, data representing previously presented image, sound files, or a combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between the first storage unit 314 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a desktop computer, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include an output device, such as the display interface 202 of FIG. 2. The first display interface 330 can include a display, a projector, a video screen, a speaker, or any combination thereof.

The first control unit 312 can operate the first user interface 318 to display information generated by the navigation system 100. The first control unit 312 can also execute the first software 326 for the other functions of the navigation system 100, including receiving location information from the location unit 320. The first control unit 312 can further execute the first software 326 for interaction with the communication path 104 via the first communication unit 316.

The location unit 320 can generate location information, current heading, current acceleration, and current speed of the first device 102, as examples. The location unit 320 can be implemented in many ways. For example, the location unit 320 can function as at least a part of the global positioning system, an inertial navigation system, a cellular-tower location system, a pressure location system, or any combination thereof. Also, for example, the location unit 620 can utilize components such as an accelerometer or GPS receiver.

The location unit 320 can include a location interface 332. The location interface 332 can be used for communication between the location unit 320 and other functional units in the first device 102. The location interface 632 can also be used for communication external to the first device 102.

The location interface 332 can receive information from the other functional units or from external sources, or can transmit information to the other functional units or to external destinations. The external sources and the external destinations refer to sources and destinations external to the first device 102.

The location interface 332 can include different implementations depending on which functional units or external units are being interfaced with the location unit 320. The location interface 332 can be implemented with technologies and techniques similar to the implementation of the first control unit 312.

The second device 106 can be optimized for implementing an embodiment of the present invention in a multiple device embodiment with the first device 102. The second device 106 can provide the additional or higher performance processing power compared to the first device 102. The second device 106 can include a second control unit 334, a second communication unit 336, a second user interface 338, and a second storage unit 346.

The second user interface 338 allows a user (not shown) to interface and interact with the second device 106. The second user interface 338 can include an input device and an output device. Examples of the input device of the second user interface 338 can include a keypad, a touchpad, softkeys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second control interface 344. The second control interface 344 can be used for communication between the second control unit 334 and other functional units in the second device 106. The second control interface 344 can also be used for communication that is external to the second device 106.

The second control interface 344 can receive information from the other functional units or from external sources, or can transmit information to the other functional units or to external destinations. The external sources and the external destinations refer to sources and destinations external to the second device 106.

The second control interface 344 can be implemented in different ways and can include different implementations depending on which functional units or external units are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the information such as data representing incoming images, data representing previously presented image, sound files, or a combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between the second storage unit 346 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second control interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second control interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100.

Figure 4:
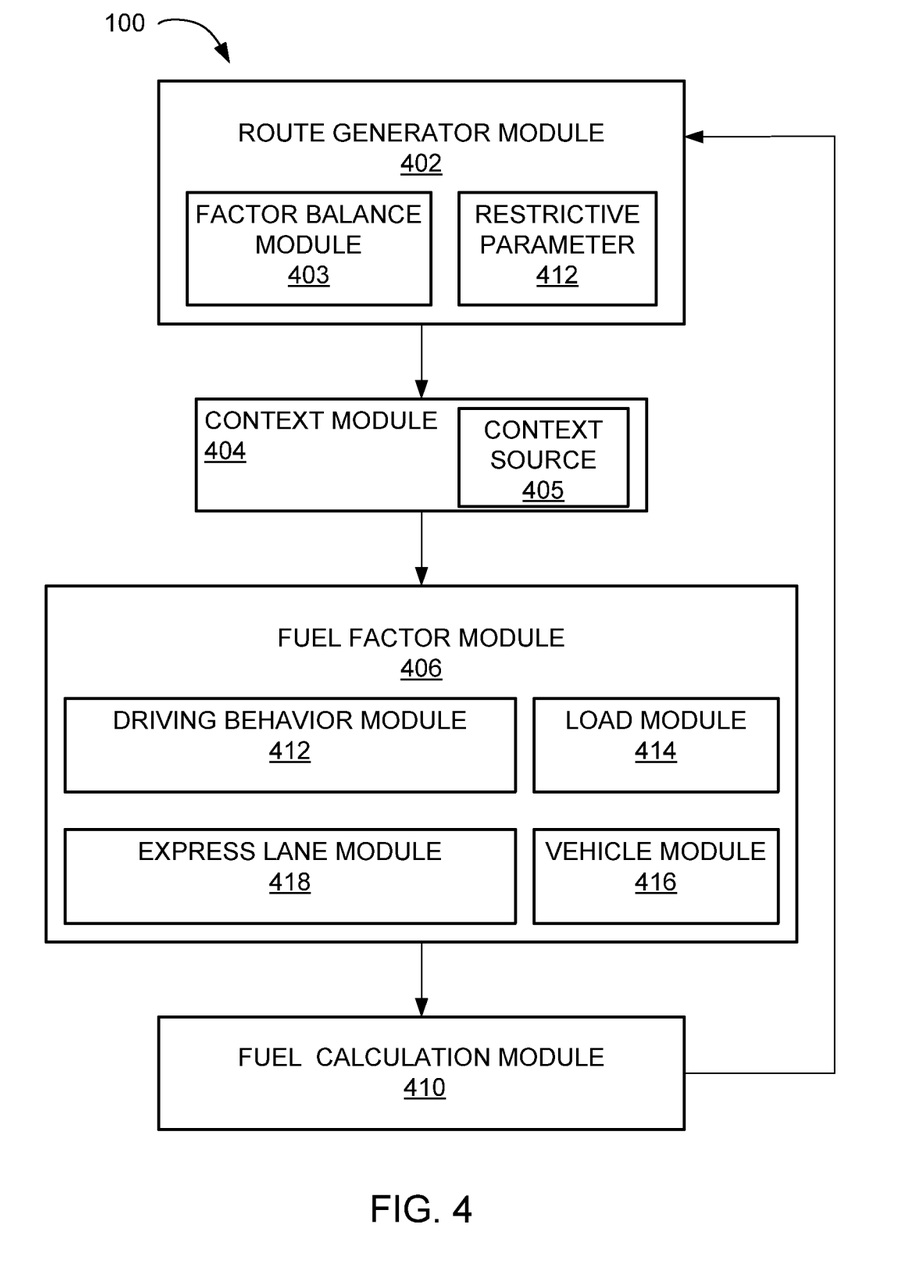
FIG. 4 is a control flow of the navigation system.

Referring now to FIG. 4, therein is shown a control flow of the navigation system 100 of FIG. 1. The navigation system 100 can include a route generator module 402, a context module 404, a fuel factor module 406, and a fuel calculation module 410.

The route generator module 402 can be coupled to the context module 404, the fuel factor module 406, the fuel calculation module 410, or a combination thereof using wired or wireless connections, by having an output of one module as an input of the other module, by having operations of one module influence operation of the other module, or a combination thereof. Similarly, the context module 404 can be coupled to the fuel factor module 406, and the fuel factor module 406 can be further coupled to the fuel calculation module 410.

The route generator module 402 is for generating the route 206 of FIG. 2 from the starting location 208 of FIG. 2 to the destination 210 of FIG. 2. The route generator module 402 can calculate route segments for the route 206 between the starting location 208 and the destination 210. The route segments can include edges with a collection of shape points.

A restrictive parameter 412 is defined as a factor for limiting route generation. The restrictive parameter 412 can include the fuel level left in the vehicle tank, amount of money in the user's possession for accessing the privilege lane 212, the time left for driving to the destination 210, or a combination thereof.

The route generator module 402 can generate multiple routes for use with the first device 102 of FIG. 1, the second device 106 of FIG. 1, or a combination thereof. For example, the route 206 can be the distance-based route 214 of FIG. 2 having minimum distance between the starting location 208 and the destination 210 among the multiple routes, given the restrictive parameter 412, or a combination thereof. Also for example, the route 206 can be the time-based route 216 of FIG. 2. The user can arrive at the destination 210 in a minimum amount of time using the time-based route 216 compared to the other routes, in light of the restrictive parameter 412, or a combination thereof.

For further example, the route 206 can be the fuel-optimization route 218 of FIG. 2 using minimum amount of fuel compared to the other routes, in light of the restrictive parameter 412, or a combination thereof. The route generator module 402 can use a processing result from the fuel calculation module 410 to generate the fuel-optimization route 218. As a more specific example, the route generator module 402 can generate the fuel-optimization route 218 based on the fuel estimate 232 of FIG. 2 calculated by the fuel calculation module 410.

For further example, the route generator module 402 can further generate the fuel-optimization route 218 by balancing the fuel usage factor 222 of FIG. 2 and the travel time 236 of FIG. 2, the travel distance 238 of FIG. 2, or a combination thereof based on the context 220 of FIG. 2. Details regarding the fuel calculation module 410 will be described below.

The route generator module 402 can use the first user interface 318 of FIG. 3, the second user interface 338 of FIG. 3, the first communication unit 316 of FIG. 3, the second communication unit 336 of FIG. 3, or a combination thereof to receive the destination 210 through inputs from the user, the navigation system 100, or a combination thereof. The route generator module 402 can use the first control unit 312 of FIG. 3, the second control unit 334 of FIG. 3, or a combination thereof to store the destination 210 in the first storage unit 314 of FIG. 3, the second storage unit 346 of FIG. 3, or a combination thereof.

The route generator module 402 can use the first control unit 312, the second control unit 334, or a combination thereof to operate the first software 326 of FIG. 3, the second software 342 of FIG. 3, or a combination thereof to generate the route 206. The route generator module 402 can further store the route 206 in the first storage unit 314, the second storage unit 346, or a combination thereof.

The route generator module 402 can include a factor balance module 403. The factor balance module 403 is for balancing the fuel usage factor 222, the travel time 236, the travel distance 238, the privilege-lane mode 230 of FIG. 2, or a combination thereof based on the context 220.

For example, the factor balance module 403 can balance factors based on current situation limitation, predetermined template, or a combination thereof. The factor balance module 403 can balance the factors by assigning priority based on the importance of the factor using the predetermined template, by eliminating the factor based on the current situation limitation, or a combination thereof.

For a more specific example, the predetermined template can be a list of factors including the hurried-driving mode 224, the load 226, the vehicle model 228, the privilege lane mode 230, the travel time 236, and the travel distance 238. The navigation system 100 can assign priority to each factor based on the context 220.

For a more specific example, the current situation limitation can be the amount of money in the user's possession being less than a toll rate for accessing the privilege lane 212. The factor balance module 403 can balance the factors by eliminating the privilege lane mode 230 based on the amount of money being less than the toll rate. Further, the route or candidate routes considered can depend on the privilege-lane mode 230. The candidate routes can be narrowed or tailored by the time fuel calculations are done.

The context module 404 is for determining the context 220 for traversing the route 206. The context module 404 can access a context source 405. The context module 404 can determine the context 220 by identifying information related to a user driving habit, a user mindset, the vehicle condition, the road condition, the weather condition, the traffic condition, an event start time, the travel time 236, the arrival time, the importance of the event, or a combination thereof from the context source 405.

The context source 405 is defined as an origin supplying information for traversing the route 206. The context source 405 can include many different origins including user calendar, the user email, the user driving history, user profile, car profile, social media, traffic control center, weather station, user survey, online survey, report from machine learning system or data mining system, or a combination thereof.

The context module 404 can determine the context 220 using multiple technologies such as pattern recognition from machine learning, data mining, or a combination thereof. The context module 404 can identify the context 220 using classification algorithms from the pattern recognition in the context source 405. The context module 404 can search the context source 405 for a keyword, a value, a pattern thereof, or a combination thereof. The context module 404 can further determine a cluster or a model based on the keyword, the value, or a combination thereof. The context module 404 can determine the context 220 as the information, such as the keyword, the value, the pattern thereof, or a combination thereof satisfying a condition, the driving threshold 225, a pattern, or a combination thereof predetermined by the navigation system 100.

The condition can include the weather condition, the traffic condition, road condition, or a combination thereof based on the event start time, the travel time 236, the arrival time. The pattern can include the relationship between the driving habit and the condition, the destination 210, or a combination thereof.

For example, the context module 404 can determine the context 220 regarding an ownership status of the vehicle operated by the user based on the information from a recently received email. When the ownership status indicates that the user is not the owner, but borrowing the vehicle, the context module 404 can further determine the context 220 regarding the vehicle model 228 of FIG. 2 and miles per gallon (MPG) rating based on the car profile of the borrowed vehicle, instead of using the car profile of the user's own vehicle. Also for example, the context module 404 can determine the context 220 for characterizing a driving behavior or a statistic corresponding to age, gender, location, or a combination thereof for the user.

For example, the context module 404 can receive the route 206 and store the route 206 in the first storage unit 314, the second storage unit 346, or a combination thereof by utilizing the first control unit 312, the second control unit 334, or a combination thereof. Also for example, the context module 404 can use the first control unit 312, the second control unit 334, first software 326, the second software 342, or a combination thereof to determine the context 220 based on the route 206, the context source 405, or a combination thereof. For another example, the second control unit 334 can determine the context 220 and use the second communication unit 336 of FIG. 3 to send the context 220 to the first storage unit 314.

The fuel factor module 406 is for determining the fuel usage factor 222. The fuel factor module 406 determines the fuel usage factor 222 including the hurried-driving mode 224 of FIG. 2, the load 226 of FIG. 2, the vehicle model 228, the privilege-lane mode 230, or a combination thereof.

For example, the fuel factor module 406 can use the first control unit 312, the second control unit 334, or a combination thereof to store the context 220 in the first storage unit 314, the second storage unit 346, or a combination thereof. The second control unit 334 can determine the hurried-driving mode 224 based on the context 220. Also for example, the fuel factor module 406 can generate the fuel usage factor 222 using the first control unit 312, the second control unit 334, or a combination thereof.

The fuel factor module 406 can include a driving behavior module 412, a load module 414, a vehicle module 416, an express lane module 418, or a combination thereof for determining the fuel usage factor 222. The driving behavior module 412 is for determining the hurried-driving mode 224 based on the context 220.

For example, the driving behavior module 412 can use the first control unit 312, the second control unit 334, or a combination thereof to determine the hurried-driving mode 224. Also for example, the driving behavior module 412 can save the hurried-driving mode 224 in the first storage unit 314, the second storage unit 346, or a combination thereof.

The driving behavior module 412 can search for a keyword, a value, a driving threshold 225, a condition, or a combination thereof predetermined by the navigation system 100 within the context 220. The driving behavior module 412 can determine the hurried-driving mode 224 when the context 220 includes the keyword, the value, information satisfying the driving threshold 225 or the condition, or a combination thereof as predetermined by the navigation system 100.

The driving behavior module 412 can further include a cluster, a model, a set of values or thresholds, a set of keywords, or a combination thereof associated with a specific value for the hurried-driving mode 224. The driving behavior module 412 can determine the hurried-driving mode 224 as the specific value based on matching the context 220 to the cluster, the model, the set of values or thresholds, the set of keywords, or a combination thereof or based on a calculated distance between the context 220 and the predetermined information.

For example, the driving behavior module 412 can determine the hurried-driving mode 224 to be zero or false based on the context 220 regarding a trip using keywords such as site-seeing, vacation, meeting with a friend, or a combination thereof. Also for example, the driving behavior module 412 can set the hurried-driving mode 224 to be true or non-zero integer based on the context 220 regarding the trip using keywords such as, client, urgent product issue, company meeting, chief executive officer, or a combination thereof.

For another example, the driving behavior module 412 can determine the hurried-driving mode 224 when the value of the vehicle speed, the acceleration, the deceleration, or a combination thereof meeting or exceeding a driving threshold 225 based on the context 220. For another example, when the information satisfies the condition regarding arrival time exceeding the event time, the driving behavior module 412 can determine the hurried-driving mode 224 to be true or non-zero integer.

The load module 414 is for determining the load 226 based on the context 220. The load module 414 can determine the load 226 based on the context 220 regarding the passengers, the luggage, the extra weight excluding the vehicle weight and the driver weight, or a combination thereof.

For example, the load module 414 can use the first communication unit 316, the second communication unit 336, or a combination thereof to determine an identity of one or more device within a communication range from the first device 102, the second device 106, or a combination thereof with a short range communication protocol. The load module 414 can determine or estimate the load 226 based on ownership status associated with the identified device.

Also for example, the load module 414 can use the first user interface 318, the second user interface 338, or a combination thereof to identify a surrounding environment of the corresponding device. The load module 414 can analyze the surrounding environment for recognizable markers, such as markers corresponding to a face, a vehicle cabin, a bag, a box, other examples or categories common for the load 226, or a combination thereof. The load module 414 can determine the load 226 based on results of processing the surrounding environment.

As a more specific example, the load module 414 can capture a visual image for the surrounding environment and perform image analysis to identify the load 226. Also as a more specific example, the load module 414 can capture an audio sample for the surrounding environment and perform vocal identification to identify a number of passengers. The load module 414 can cross reference the audio sample to radio signals, vehicle audio output status, other software or application for recognizing known sounds, such as celebrity voices or published songs, or a combination thereof to filter sounds generated by the vehicle.

The vehicle module 416 is for determining the vehicle model 228 based on the context 220. For a specific example, the vehicle module 416 can determine the vehicle model 228 based on the context 220 including a purchase record, such as a receipt or a vehicle registration. The vehicle module 416 can also set the vehicle model 228 based on the context 220 including information received from the vehicle.

For example, the vehicle module 416 can use the first control unit 312, the second control unit 334, or a combination thereof to determine the vehicle model 228. The vehicle module 416 can save the vehicle model 228 in the first storage unit 314, the second storage unit 346, or a combination thereof. Also for example, after the first software 326 is used to determine the vehicle model 228, the first control unit 312 can operate the first display interface 330 to display the vehicle model 228.

The express lane module 418 is for determining the privilege-lane mode 230 based on the context 220. The express lane module 418 can search for the privilege lane 212 within the set of routes determined by the route generator module 402. When privilege lane 212 is determined, the express lane module 418 can further determine the privilege-lane mode 230 by identifying the context 220 satisfying the predetermined information corresponding to the access requirement for the privilege lane 212.

For example, the express lane module 418 can use the first control unit 312, the second control unit 334, or a combination thereof to operate the first software 326, the second software 342, or a combination thereof to determine the privilege-lane mode 230. Also for example, the privilege-lane mode 230 can be retrieved from the first storage unit 314 and transmit through the first communication unit 316 to the second storage unit 346.

For example, the express lane module 418 can identify the context 220 associated with a number of passengers, such as from determining the load 226, a current time, a membership status, a status regarding availability of funds, a status regarding access to payment mechanism, or a combination thereof. For a more specific example, the express lane module 418 can set the privilege-lane mode 230 as true when there are one or more passengers in the vehicle, when the current time is within an access duration, or a combination thereof for the privilege lane 212, as required by traffic regulations governing the route 206. Also for a more specific example, the express lane module 418 can assign the privilege-lane mode 230 as non-zero integer when the privilege lane 212 is detected and the membership status, the fund status, or a combination thereof is sufficient for accessing the privilege lane 212.

The fuel calculation module 410 is for calculating the fuel estimate 232 for the route 206. The fuel calculation module 410 calculates the fuel estimate 232 based on the fuel usage factor 222 and the route 206. The fuel calculation module 410 can identify road segments within the route 206, calculate the fuel usage for each road segment, and generate the fuel estimate 232 for the route 206 by summarizing the fuel usage for each road segment.

The fuel estimate 232 can be represented in multiple ways, such as in gallons or liters, or normalized value 233 by further processing the fuel estimate 232 using normalization. The fuel estimate 232 for the set of routes generated by the route generator module 402 can be divided by the fuel estimate 232 of the fuel-optimization route 218 for normalization. For example, the fuel estimate 232 for the distance-based route 214, the time-based route 216 and the fuel-optimization route 218 can be represented as 1.2, 1.4 and 1.0, respectively.

The fuel calculation module 410 can send the fuel estimate 232 for the set of routes back to the route generator module 402. The route generator module 402 can regenerate the set of routes based on the fuel estimate 232 and balancing the fuel usage factor 222 and the travel time 236, the travel distance 238, or a combination thereof. The navigation system 100 can determine the set of routes including the distance-based route 214, the time-based route 216 and the fuel-optimization route 218 by iterating the modules including the route generator module 402, the context module 404, the fuel factor module 406, the fuel calculation module 410, or a combination thereof for a certain number of time pre-determined by the navigation system 100, and by selecting the most optimal routes from the set of routes.

For example, the fuel calculation module 410 can calculate the fuel estimate 232 based on the hurried-driving mode 224. The fuel calculation module 410 can increase the fuel estimate 232 when the hurried-driving mode 224 is determined, such as true or a non-zero integer. An amount for the increase can be determined based on the user driving history.

Also for example, the fuel calculation module 410 can calculate the fuel estimate 232 based on the load 226. The fuel calculation module 410 can identify a road resistance or an increase in required force for accelerating the vehicle caused by the load 226. The fuel calculation module 410 can determine an increase in the fuel estimate 232 to account for the additional road resistance or the additional force. The certain percentage can be determined based on the user driving history, or a profile or an equation predetermined by the navigation system 100, or a combination thereof.

For further example, the fuel calculation module 410 can calculate the fuel estimate 232 based on the vehicle model 228. The vehicle model 228 can include or identify the manufacturer specific model, a fuel usage characteristic, such as for a hybrid electric vehicle or a turbocharged vehicle, primary input fuel, or a combination thereof for the vehicle. The fuel calculation module 410 can calculate the fuel estimate 232 for the route 206 using the fuel usage characteristic derived from the vehicle model 228. The fuel calculation module 410 can include the fuel usage characteristic for various vehicles.

For further example, the fuel calculation module 410 can calculate the fuel estimate 232 based on the privilege-lane mode 230. When the privilege-lane mode 230 is true, the fuel calculation module 410 can determine the driving speed of the vehicle as constant. The amount of adjustment based on the privilege-lane mode 230 can be calculated based on the user driving history, or a profile or an equation predetermined by the navigation system 100, or a combination thereof.

The fuel calculation module 410 can use the first control unit 312, the second control unit 334, or a combination thereof to operate the first software 326, the second software 342, or a combination thereof to calculate the fuel estimate 232 for the route 206 based on the context 220. The fuel calculation module 410 can further use the first control unit 312 to operate the first storage unit 314 to save the fuel estimate 232 for the route 206. The fuel calculation module 410 can further use the first control unit 312 to operate the first communication unit 316 to send the fuel estimate 232 for the route 206 to the second storage unit 346.

It has been discovered that the fuel usage factor 222 including the hurried-driving mode 224, the load 226, the vehicle model 228, the privilege-lane mode 230, or a combination thereof improves accuracy of the fuel estimation 232. The various different aspects of the fuel usage factor 222 can be used to account for an increased amount of real-world factors affecting the fuel usage. The navigation system 100 can use the fuel usage factor 222 to accurately account for the real-world factors affecting the fuel usage.

It has been discovered that the fuel-optimization route 218 based on the fuel usage factor 222 provides increased fuel efficiency for the user. The fuel-optimization route 218 can provide the user with optimized fuel efficient route to reach the destination 210. The user can reduce fuel usage and further lower fuel cost by using the fuel-optimization route 218. The fuel-optimization route 218 can reduce air pollution and further improves environment by saving fuel consumption.

It has further been discovered that the fuel-optimization route 218 resulting from balancing the fuel usage factor 222 with user's situation as indicated by the context 220 provides the route 206 relevant to the user. The balancing process described above can eliminate routes that are inapplicable based on user's situation or condition, such as having limited amount of time or fuel, as described above. The elimination of irrelevant routes based on contextual limitations provides the user with the fuel-optimization route 218 with contextually relevant and usable route.

The modules described in this application can be hardware implementation or hardware accelerators in the first control unit 312 of FIG. 3 or in the second control unit 334 of FIG. 3. The modules can also be hardware implementation or hardware accelerators within the first device 102 or the second device 106 but outside of the first control unit 312 or the second control unit 334, respectively, as depicted in FIG. 3. However, it is understood that the first control unit 312, the second control unit 334, or a combination thereof can collectively refer to all hardware accelerators for the modules.

The physical transformation from the fuel usage factor 222 results in the movement in the physical world, such as a user selecting and traversing a specific route. Movement in the physical world results in changes to the fuel usage factor 222 or the data corresponding to the fuel estimate 232 as indicated by the context 220. The context 220 can be fed back into the navigation system 100 for updating the fuel usage factor 222 and further generating the fuel-optimization route 218.

The navigation system 100 describes the module functions or orders as an example. The modules can be partitioned differently. For example, the context module 404 and the fuel factor module 406 can be combined. Also for example, the fuel calculation module 410 can receive the route 206 from the route generator module 402 directly. Each of the modules can operate individually and independently of the other modules.

Furthermore, data generated in one module can be used by another module without being directly coupled to each other. For example, the route generator module 402 can receive the fuel usage factor 222 from the fuel factor module 406.

The modules described in this application can be implemented as instructions stored on a non-transitory computer readable medium to be executed by a first control unit 312, the second control unit 334, or a combination thereof. The non-transitory computer medium can include the first storage unit 314 of FIG. 3, the second storage unit 346 of FIG. 3, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 5:
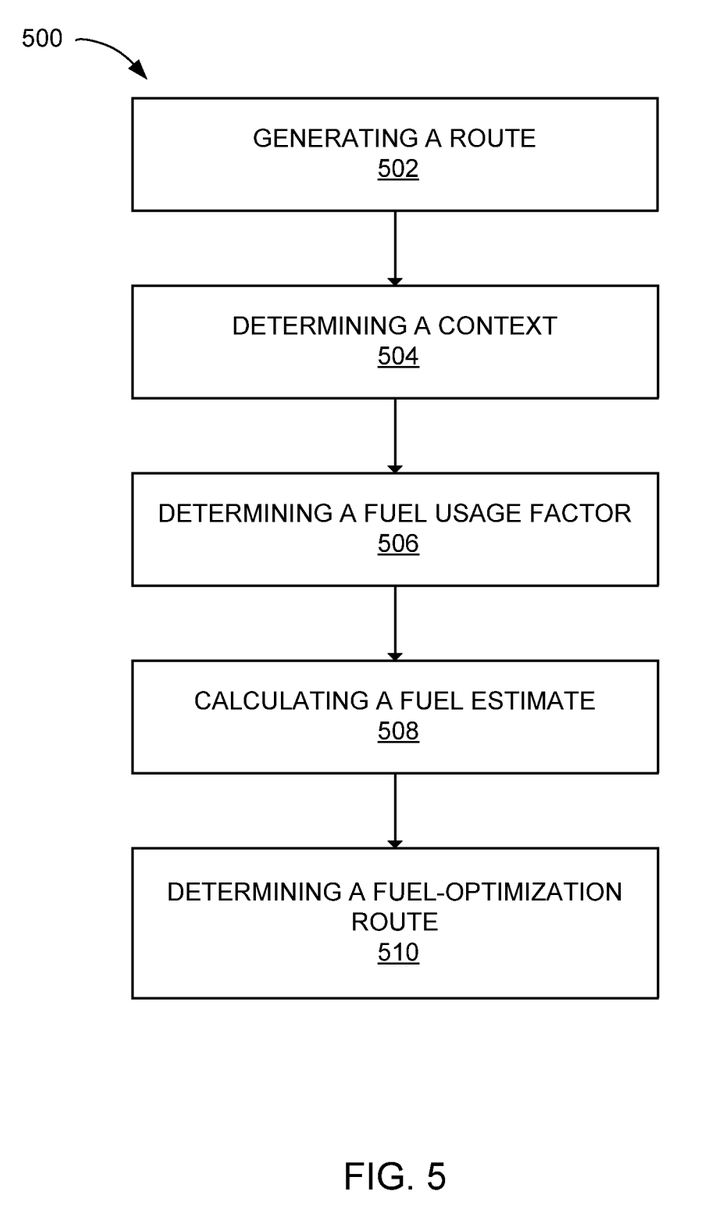
FIG. 5 is a flow chart of a method of operation of a navigation system in an embodiment of the present invention.

Referring now to FIG. 5, therein is shown a flow chart of a method 500 of operation of a navigation system 100 in an embodiment of the present invention. The method 500 includes: generating a route having a travel time and a travel distance in a block 502; determining a context for using the route in a block 504; determining a fuel usage factor based on the context for evaluating the route in a block 506; calculating a fuel estimate for the route based on the fuel usage factor in a block 508; and determining a fuel-optimization route based on the fuel estimate for displaying on a device in a block 510.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a navigation system comprising:
generating a route, including a travel time and a travel distance, based on balancing factors, associated with a current situation limitation, according to a priority of the factors;
determining a context, including a keyword, for traversing the route;
determining a fuel usage factor based on the context for evaluating the route;
calculating a fuel estimate, with a control unit, for the route based on the fuel usage factor, wherein the fuel estimate represents a normalized value for comparison of different routes; and
determining a fuel-optimization route based on the fuel estimate for displaying on a device.

2. The method as claimed in claim 1 further comprising:
determining a hurried-driving mode based on the context; and
wherein:
determining the fuel usage factor includes determining the fuel usage factor including the hurried-driving mode evaluating the fuel-optimization-route.

3. The method as claimed in claim 1 further comprising:
determining a load based on the context; and
wherein:
determining the fuel usage factor includes determining the fuel usage factor including the load for evaluating the fuel-optimization route.

4. The method as claimed in claim 1 further comprising:
determining a privilege-lane mode based on the context; and
wherein:
determining the fuel usage factor includes determining the fuel usage factor including the privilege-lane mode for evaluating the route.

5. The method as claimed in claim 1 further comprising:
determining a vehicle model based on the context; and
wherein:
determining the fuel usage factor includes determining the fuel usage factor including the vehicle model for evaluating the route.

6. The method as claimed in claim 1 wherein determining the fuel-optimization route based on the fuel estimate includes balancing the fuel usage factor and the travel time, the travel distance, or a combination thereof based on the context.

7. The method as claimed in claim 1 further comprising:
determining a hurried-driving mode based on the context; and
wherein:
determining the fuel-optimization route includes balancing the fuel usage factor including the hurried-driving mode for evaluating the fuel-optimization-route.

8. The method as claimed in claim 1 further comprising:
determining a load based on the context; and
wherein:
determining the fuel-optimization route includes balancing the fuel usage factor including the load for evaluating the fuel-optimization route.

9. The method as claimed in claim 1 further comprising:
determining a privilege-lane mode based on the context; and
wherein:
determining the fuel-optimization route includes balancing the fuel usage factor including the privilege-lane mode for evaluating the fuel-optimization route.

10. The method as claimed in claim 1 further comprising:
determining a vehicle model based on the context; and
wherein:
determining the fuel-optimization route includes balancing the fuel usage factor including the vehicle model for evaluating the fuel-optimization route.

11. A navigation system comprising:
a control unit for:
generating a route, including a travel time and a travel distance, based on balancing factors, associated with a current situation limitation, according to a priority of the factors;
determining a context, including a keyword, for using the route;
determining a fuel usage factor based on the context for evaluating the route;
calculating a fuel estimate for the route based on the fuel usage factor and the route; and determining a fuel-optimization route based on the fuel estimate; and a user interface, coupled to the control unit, for:

displaying the fuel-optimization route on a device.

12. The system as claimed in claim 11 wherein the control unit is for:

determining a hurried-driving mode based on the context; and determining the fuel usage factor including the hurried-driving mode evaluating the fuel-optimization-route.

13. The system as claimed in claim 11 wherein the control unit is for:

determining a load based on the context; and determining the fuel usage factor including the load for evaluating the fuel-optimization route.

14. The system as claimed in claim 11 wherein the control unit is for:

determining a privilege-lane mode based on the context; and determining the fuel usage factor including the privilege-lane mode for evaluating the route.

15. The system as claimed in claim 11 wherein the control unit is for:

determining a vehicle model based on the context; and determining the fuel usage factor including the vehicle model for evaluating the route.

16. The system as claimed in claim 11 wherein the control unit is for determining the fuel-optimization route based on the fuel estimate and balancing the fuel usage factor and the travel time, the travel distance, or a combination thereof based on the context.

17. The system as claimed in claim 11 wherein the control unit is for:

determining a hurried-driving mode based on the context; and determining the fuel-optimization route including balancing the fuel usage factor including the hurried-driving mode for evaluating the fuel-optimization-route.

18. The system as claimed in claim 11 wherein the control unit is for:

determining a load based on the context; and determining the fuel-optimization route including balancing the fuel usage factor including the load for evaluating the fuel-optimization route.

19. The system as claimed in claim 11 wherein the control unit is for:

determining a privilege-lane mode based on the context; and determining the fuel-optimization route including balancing the fuel usage factor including the privilege-lane mode for evaluating the fuel-optimization route.

20. The system as claimed in claim 11 wherein the control unit is for:

determining a vehicle model based on the context; and determining the fuel-optimization route including balancing the fuel usage factor including the vehicle model for evaluating the fuel-optimization route.

* * * * *